US006981744B2

(12) United States Patent
Elterman et al.

(10) Patent No.: US 6,981,744 B2
(45) Date of Patent: Jan. 3, 2006

(54) FOLD AND TUMBLE FLOOR-MOUNTED VEHICLE SEAT

(75) Inventors: Sam Elterman, Commerce Township, MI (US); Paul H Shea, Livonia, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 10/702,869

(22) Filed: Nov. 6, 2003

(65) Prior Publication Data

US 2005/0099047 A1 May 12, 2005

(51) Int. Cl.
*A47C 1/02* (2006.01)

(52) U.S. Cl. .............. 297/336; 297/378.12; 297/378.1; 296/65.1

(58) Field of Classification Search ................ 297/331, 297/336, 335, 344.1, 378.12, 378.1; 296/65.09, 296/65.03, 65.08
See application file for complete search history.

(56) References Cited

U.S. PATENT DOCUMENTS 5,482,345 A * 1/1996 Bolsworth et al. ....... 296/65.03
5,662,368 A * 9/1997 Ito et al. .................. 296/65.05
5,690,386 A * 11/1997 Chabanne .................. 297/367
5,871,255 A * 2/1999 Harland et al. ............. 297/257
6,000,742 A 12/1999 Schaefer et al.
6,129,404 A 10/2000 Mattarella et al.
6,135,555 A * 10/2000 Liu et al. .................... 297/336
6,174,017 B1 * 1/2001 Salani et al. ............. 296/65.03
6,354,663 B1 * 3/2002 Zhang et al. ............... 297/336
6,382,491 B1 * 5/2002 Hauser et al. ........... 296/65.05
6,520,581 B1 * 2/2003 Tame ......................... 297/336
6,568,736 B2 * 5/2003 Jach et al. ............... 296/65.09
6,572,192 B2 * 6/2003 Pichon et al. ............... 297/335
6,688,666 B2 * 2/2004 Neale et al. ............. 296/65.09
6,698,829 B1 * 3/2004 Freijy et al. ........... 297/188.09

* cited by examiner

*Primary Examiner*—Peter M. Cuomo
*Assistant Examiner*—Erika Garrett
(74) *Attorney, Agent, or Firm*—Ralph E. Smith

(57) ABSTRACT

A folding seat assembly for a vehicle includes a seat base pivotally mounted to the floor of the vehicle, and a seat back mounted to the seat base and pivotable from a perpendicular to a parallel orientation to the seat base. The seat back is retained in an upright orientation within the vehicle by a latch mechanism in an upper portion of the seat back connecting the seat back to the vehicle, and by a hook mechanism in a lower portion of the seat back, proximate the seat base. With the latch mechanism released, the seat back can pivot toward the parallel orientation, which causes the hook mechanism to disengage. With the hook mechanism disengaged, the parallel seat back and base can pivot together relative to the vehicle, such as to fold and tumble into a storage position.

10 Claims, 3 Drawing Sheets

FOLD AND TUMBLE FLOOR-MOUNTED VEHICLE SEAT

CROSS-REFERENCE TO RELATED APPLICATIONS

Not applicable.

STATEMENT REGARDING FEDERALLY SPONSORED RESEARCH

Not applicable.

BACKGROUND OF THE INVENTION

1. Field of the Invention

The invention relates to a folding seat for a vehicle, pivotally mounted for folding from a use to a storage position. In one of its aspects, the invention relates to a simple latching mechanism that automatically engages or disengages as the seat is folded or extended.

2. Description of Related Art

Folding automobile seats are becoming increasingly prevalent in modern vehicle, particularly larger multipurpose vehicles that are expected to the serve as people haulers and be convertible to a cargo carrying function. Folding seats generally require more complex securing mechanisms than are required by permanently mounted or fixed seating. This added complexity increases the cost and weight of the seating, and the operation of the folding mechanism can sometimes be counterintuitive, with a requirement to manually operate multiple latches in an exacting sequence.

It would be advantageous to develop a folding automobile seat that is securely fixed within the automobile while in use, but is operable for folding by a mechanism having reduced weight and complexity.

BRIEF SUMMARY OF THE INVENTION

A folding and mounting system for a vehicle seat. The seat comprises a seat back pivotally mounted to a seat base, adapted for mounting within a vehicle in a use position wherein the seat back is upright and the seat base is horizontal, and adapted to transition to a storage position wherein the seat back and seat base are parallel. The folding and mounting system comprises the seat base being pivotally mounted to a floor of the vehicle at a seat base edge opposite the seat back, a catch attached to the vehicle proximate the seat base and seat back, and a pin attached to the vehicle proximate an upper portion of the seat back. The seat back includes a hook proximate the seat base for engaging the catch, and a latch mechanism for engaging the pin, whereby the seat back is secured in an upright position by the latch mechanism and pin and, upon disengagement, the seat back is adapted to pivot toward the seat base. The hook disengages the catch, enabling the seat back and seat base to pivot together about the seat base edge.

BRIEF DESCRIPTION OF THE SEVERAL VIEWS OF THE DRAWINGS

The present invention will become more fully understood from the detailed description and the accompanying drawings, wherein.

DETAILED DESCRIPTION OF THE INVENTION

Figure 1:
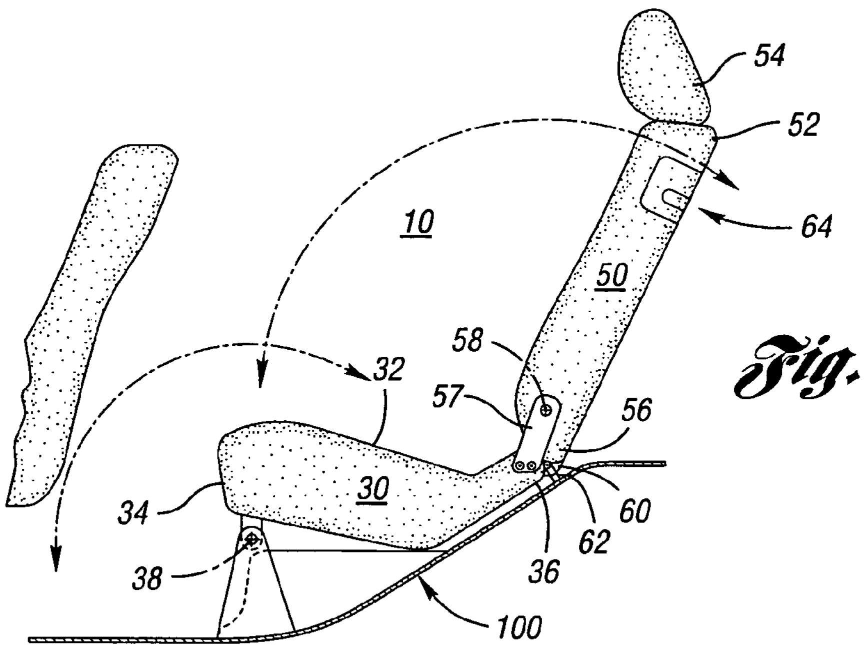
FIG. 1 is a side view of a fold and tumble floor-mounted seat assembly according to the invention in an upright use position.
Figure 2:
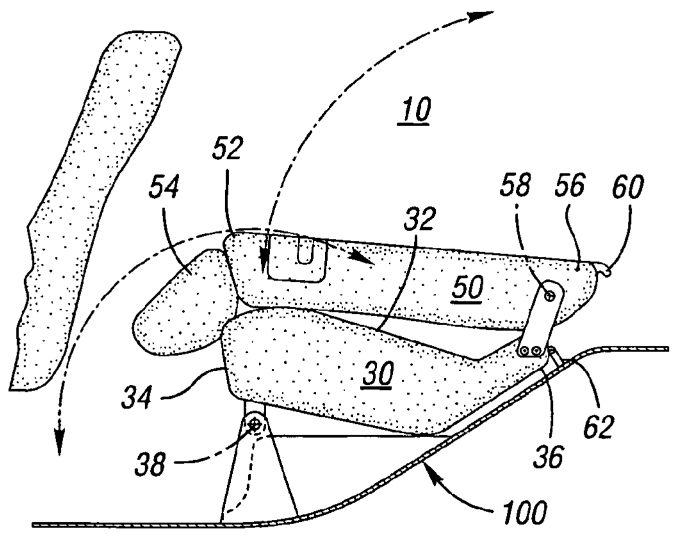
FIG. 2 is a side view of the seat assembly of FIG. 1 in a folded position.
Figure 3:
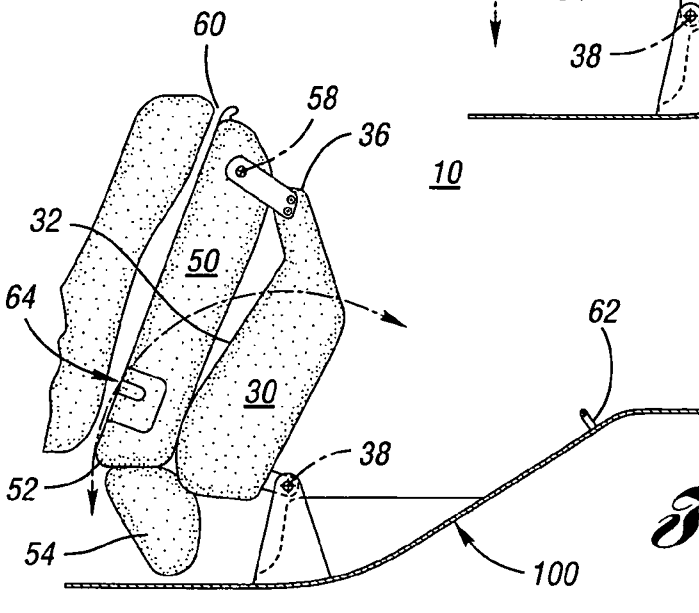
FIG. 3 is a side view of the seat assembly of FIGS. 1–2 in a storage position.

Referring to FIGS. 1–3, a fold and tumble seat assembly 10 according to the invention includes a seat base 30 and a seat back 50. Seat base 30 includes an upper surface 32, a forward edge 34 and a rearward edge 36, and is shown pivotally mounted to a vehicle interior 100 at forward pivot 38.

Seat back 50 includes an upper extent 52 and a lower extent 56. A headrest 54 is connected to upper extent 52 of seat back 50. Seat back 50 is pivotally mounted to seat base 30 by rear pivot bracket 57 at seat back pivot 58 positioned proximate rearward edge 36 of seat base 30 and lower extent 56 of seat back 50. Seat back 50 further includes a latching mechanism 64 positioned proximate upper extent 52 and aligned with a pin (not shown) mounted in vehicle 100. Latch mechanism 64 is adapted to releasably connect with the pin (not shown).

Figure 4:
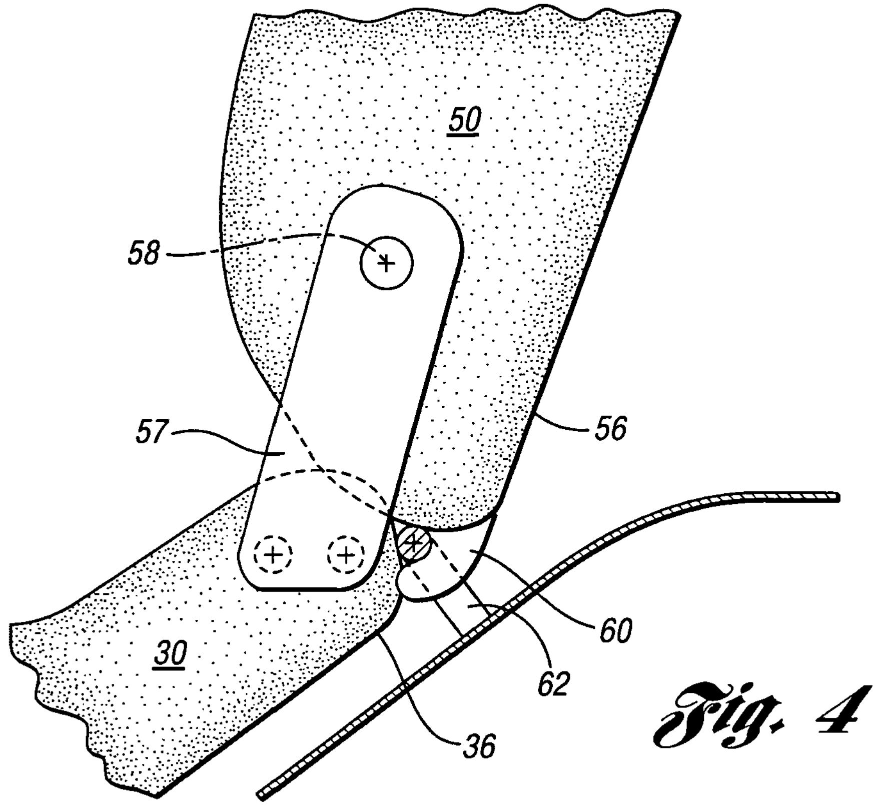
FIG. 4 is an enlarged side view of the seat assembly hook mechanism of FIGS. 1–3 in an upright position.

Referring now to FIG. 4, seat back 50 includes a hook 60 protruding from lower extent 56. The hook 60 is adapted to connect with a bar strap 62 mounted in vehicle 100 proximate the rearward edge 36 of seat base 30 and lower extent 56 of seat back 50.

FIGS. 1 and 4 depict the fold and tumble seat assembly 10 in an upright, use position, wherein seat base 30 is substantially horizontal and seat back 50 is substantially vertical, the seat assembly 10 being ready to receive an occupant (not shown). In this upright, use position, hook 60 is engaged with bar strap 62, and latch mechanism 64 is engaged with the pin (not shown) mounted in vehicle 100.

Figure 5:
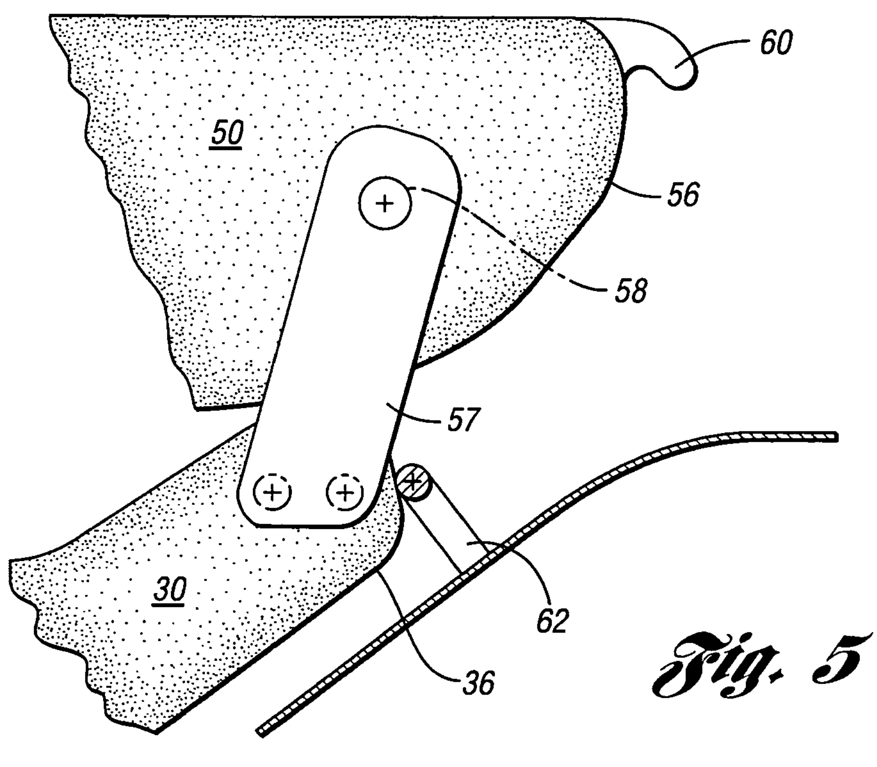
FIG. 5 is an enlarged side view of the seat assembly hook mechanism of FIGS. 1–4 in the folded position.

FIGS. 2 and 5 depict a next step in a sequence of folding the fold and tumble seat assembly 10, wherein seat back 50 has been rotated forward about seat back pivot 58 over seat base upper surface 32. In order for seat back 50 to rotate forward over seat base 30, latch mechanism 64 must first be actuated to release the pin mounted in vehicle 100. Once latch mechanism 64 has released the pin, seat back 50 can rotate forward. As seat back 50 rotates forward about seat back pivot 58, hook 60 disengages bar strap 62.

In the upright position shown in FIGS. 1 and 4, seat base 30 is secured from rotating about forward pivot 38 by hook 60 engaged with bar strap 62. Referring to FIG. 3, fold and tumble seat assembly 10 is rotated forward about forward pivot 38. In sequence, seat back 50 is first folded over seat base 30 (see FIGS. 2 and 5). This step causes hook 60 to disengage from bar strap 62. The folded assembly 10 can then be rotated about forward pivot 38 to the storage position of FIG. 3. The assembly 10 can be returned to the use position in the reverse sequence.

Figure 6:
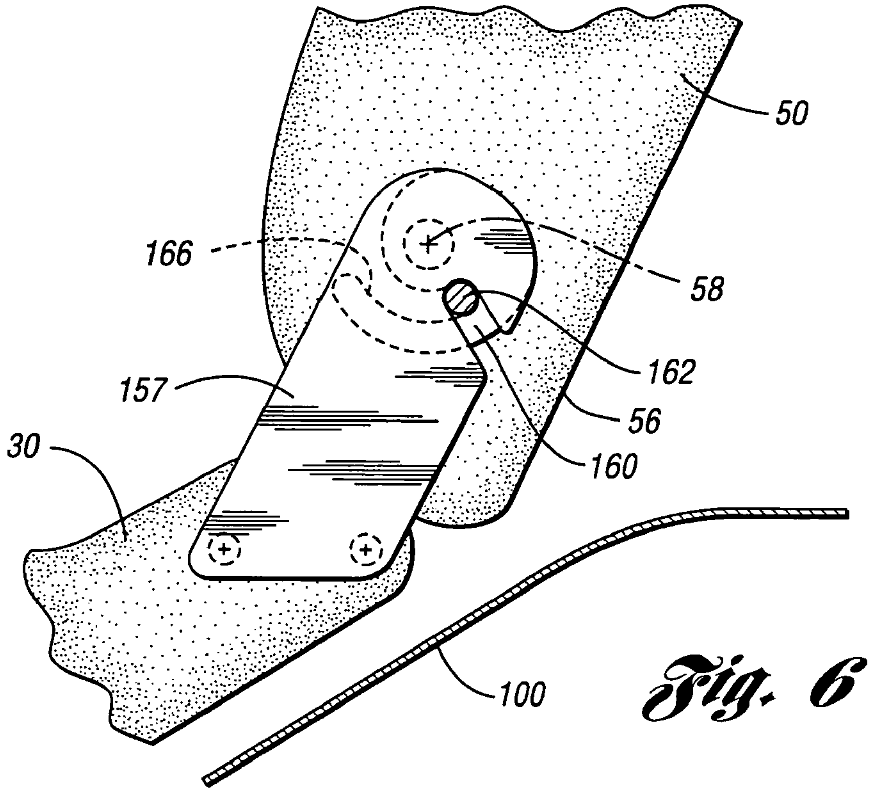
FIG. 6 is an enlarged side view of a further embodiment of a seat assembly hook mechanism according to the invention in an upright position.
Figure 7:
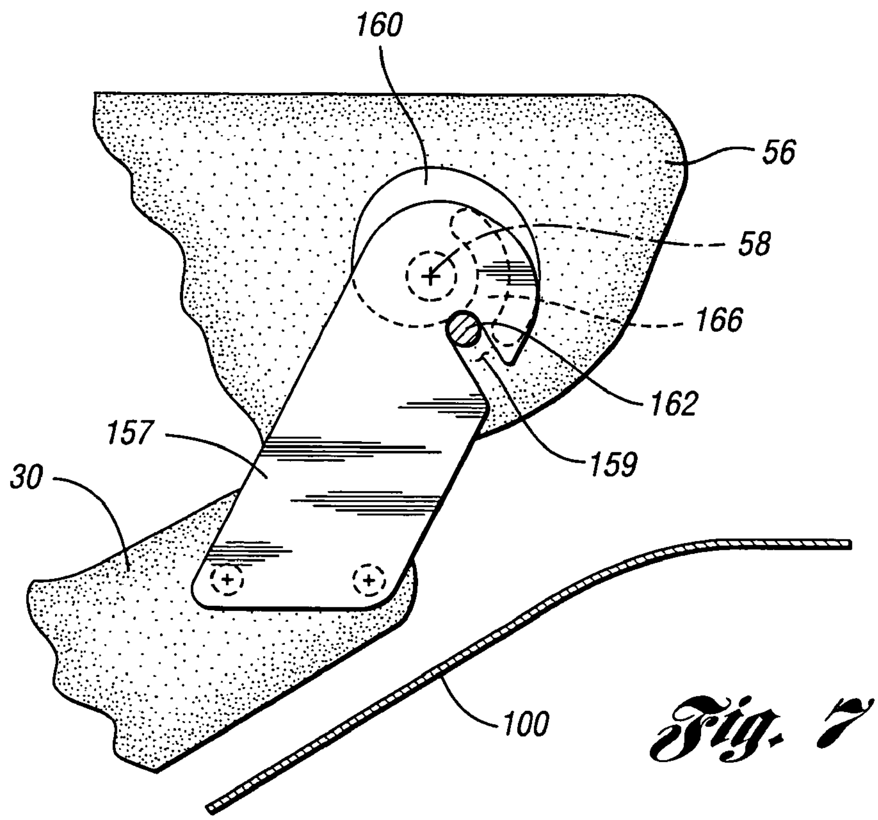
FIG. 7 is an enlarged side view of the seat assembly hook mechanism of FIG. 6 in the folded position.

Referring now to FIGS. 6–7, a further embodiment of the seat assembly 110 includes a hook 160 mounted to seat back 50 at seat back pivot 58. Hook 160 is mounted to seat back

50 so as to rotate with seat back 50 as it pivots about seat back pivot 58. Hook 160 includes an arcuate slot 166 having a center of curvature coinciding with seat back pivot 58.

Seat back 50 is pivotally mounted to rear pivot bracket 157 at seat back pivot 58. Rear pivot bracket 157 includes a rearwardly directed slot 159. Slot 159 can be arcuate, having a center of curvature coincident with forward pivot 38.

With the seat assembly 110 in the use position shown in FIG. 6, it can be seen that a pin 162 is trapped between hook 160 and rear pivot bracket 157, in slots 166, 159 respectively. Pin 162 is fixed to a vehicle sidewall (not shown). In combination with the latch mechanism 64 (as shown in FIGS. 1–3), seat assembly 110 is secured within vehicle 100.

As seat back 50 rotates forward, as shown in FIG. 7, hook 160 pivots about seat back pivot 58, causing slot 166 to rotate off of pin 162. Slot 166 is configured to traverse an arc of approximately ninety degrees or more, as appropriate, to prevent release of pin 162 until seat back 50 is in the desired folded position. With seat back 50 in the folded position shown in FIG. 7, seat assembly 110 is free to pivot forward about front pivot 38 as pin 162 is free to pass through slot 159 of rear pivot bracket 157. If slot 159 is not arcuate, it must be made sufficiently wide to allow pin 162 to slide clear as seat assembly 110 is pivoted forward.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the scope of the appended claims.

What is claimed is:

1. A folding and mounting system for a vehicle seat comprising a seat back pivotally mounted to a seat base, the vehicle seat adapted for mounting within a vehicle in a use position wherein the seat back is upright and the seat base is horizontal, and adapted to transition to a storage position wherein the seat back and seat base are parallel, the system comprising:

the seat base being pivotally mounted to a floor of the vehicle at a seat base edge opposite the seat back;

a catch attached to the vehicle proximate the seat base and seat back; and the seat back including a hook proximate the seat base for engaging the catch, and a latch mechanism proximate an upper portion of the seat back for securing the seat back to the vehicle, whereby the seat back is secured in an upright position by the latch mechanism and, upon disengagement of the latch mechanism, the seat back is adapted to pivot toward the seat base, pivoting of the seat back causing the hook to disengage from the catch, thereby enabling the seat back and seat base to pivot together about the seat base edge.

2. The folding and mounting system of claim 1, wherein the latch mechanism comprises a mechanical latch mounted to the seat back and a pin mounted to the vehicle.

3. The folding and mounting system of claim 1, wherein the hook comprises an arcuate slot for engaging the catch, the arcuate slot traversing a ninety degree arc.

4. The folding and mounting system of claim 3, wherein the seat back is pivotally mounted about a seat back pivot axis to a bracket attached to the seat base, the bracket comprising a second slot for receiving the catch.

5. The folding and mounting system of claim 4, wherein the arcuate slot has a center of curvature coincident with the seat back pivot axis.

6. A folding seat in a vehicle comprising a seat base and a seat back pivotally mounted to a rearward extent of the seat base about a seat back pivot axis, the seat base being pivotally connected to the vehicle at a forward extent, the seat back including a latch mechanism at an upper extent for detachably connecting the seat back to the vehicle in a substantially upright position, and a hook defining an arcuate slot for releasably engaging a pin mounted to the vehicle, the hook being fixedly mounted to a lower extent of the seat back, pivoting of the seat back about the seat back pivot axis causing the hook to disengage from the pin, thereby enabling the seat back and seat base to pivot together about the forward extent of the seat base.

7. A folding and mounting system for a vehicle seat comprising a seat back pivotally mounted to a seat base, the vehicle seat adapted for mounting within a vehicle in a use position wherein the seat back is upright and the seat base is horizontal, and adapted to transition to a storage position wherein the seat back and seat base are parallel, the system comprising:

the seat base being pivotally mounted to a floor of the vehicle at a seat base edge opposite the seat back;

a catch attached to the vehicle proximate the seat base and seat back; and the seat back including a hook proximate the seat base comprising an arcuate slot traversing a ninety degree arc for engaging the catch, and a latch mechanism proximate an upper portion of the seat back for securing the seat back to the vehicle, whereby the seat back is secured in an upright position by the latch mechanism and, upon disengagement of the latch mechanism, the seat back is adapted to pivot toward the seat base, thereby disengaging the hook from the catch, enabling the seat back and seat base to pivot together about the seat base edge.

8. The folding and mounting system of claim 7, wherein the latch mechanism comprises a mechanical latch mounted to the seat back and a pin mounted to the vehicle.

9. The folding and mounting system of claim 7, wherein the seat back is pivotally mounted about a seat back pivot axis to a bracket attached to the seat base, the bracket comprising a second slot for receiving the catch.

10. The folding and mounting system of claim 9, wherein the arcuate slot has a center of curvature coincident with the seat back pivot axis.

* * * * *